United States Patent [19]

Doiron

[11] 4,189,111
[45] Feb. 19, 1980

[54] FLY TYERS BOBBIN

[76] Inventor: Joseph G. Doiron, 7520 SW. Bonita Rd., Tigard, Oreg. 97232

[21] Appl. No.: 953,634

[22] Filed: Oct. 23, 1978

[51] Int. Cl.² .................................................. B65H 49/18
[52] U.S. Cl. ........................................ 242/140; 242/1; 242/7.19
[58] Field of Search .................. 242/1, 7.19, 134, 136, 242/137, 137.1, 138, 140, 141, 146, 153

[56] References Cited

U.S. PATENT DOCUMENTS

| | | | |
|---|---|---|---|
| 31,960 | 4/1861 | DeForest | 242/153 |
| 903,272 | 11/1908 | Craighead | 242/137.1 |
| 1,809,607 | 6/1931 | Swigart | 242/137.1 |
| 2,220,878 | 11/1940 | Harvey | 242/140 |
| 2,338,353 | 1/1944 | Perkins | 242/7.19 |
| 2,464,542 | 3/1949 | Zarrs | 242/140 |
| 2,478,255 | 8/1949 | Drow | 242/137.1 |
| 2,479,710 | 8/1949 | Arnold | 242/137.1 |
| 2,635,832 | 4/1953 | Richmond | 242/140 |
| 2,798,681 | 7/1957 | Beverino | 242/137.1 |
| 3,827,653 | 8/1974 | Taylor | 242/137.1 |

FOREIGN PATENT DOCUMENTS 443604  7/1912  France ................ 242/137.1

Primary Examiner—Stanley N. Gilreath
Attorney, Agent, or Firm—Charles R. Fay

[57] ABSTRACT

A fly tyers bobbin having improved means for holding the spool of thread and a double thread guide or holder having a removable member for fine threads such as tying fly heads, and alternatively a larger guide for using wool or floss.

3 Claims, 2 Drawing Figures

FLY TYERS BOBBIN

BACKGROUND OF THE INVENTION

A fly tyers bobbin is a very handy and efficient device helping the fly tyer tie his flies in a fast and efficient manner. There are many such bobbins but the present bobbin allows for digital adjustment of pressure on the thread for certain fly tying operations providing for tension as the thread is wound on the fly; and also it has a removable thread guide for pulling of thin or fine threads such as silk, nylon or the like for tying heads with another guide particularly adapted for the use of chenille, wool, or floss, which have thicker or greater diameters than the thin fine thread for tying heads.

SUMMARY OF THE INVENTION

Means is provided to hold a spool of material and this has a tubular member therepm woth a thread guiding eye at a free end thereof. Removably mounted in the tubular member is a smaller like member with a smaller thread guiding eye for use with fine silk and nylon.

PREFERRED EMBODIMENT OF THE INVENTION

Figure 1:
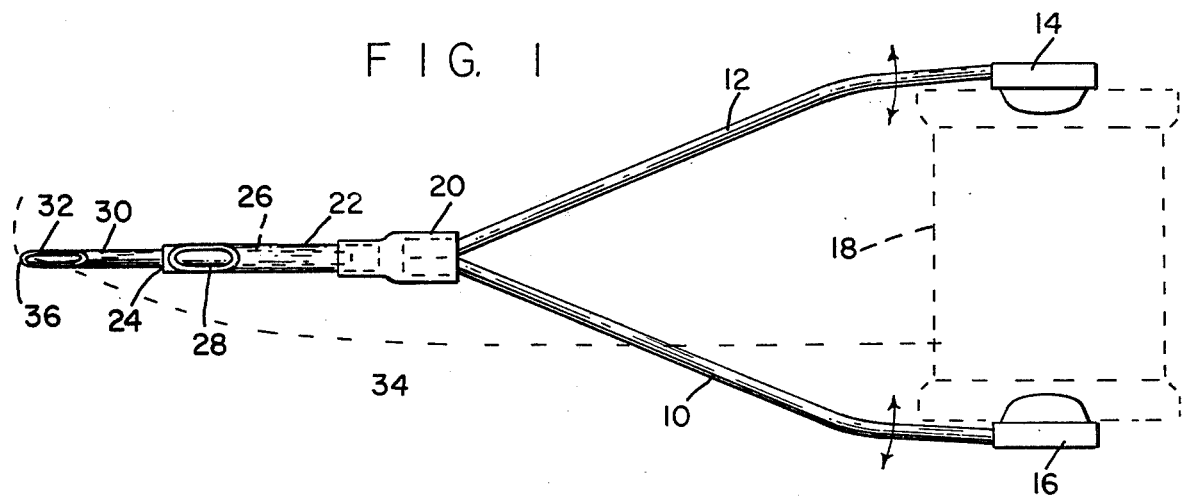
FIG. 1 is a view in elevation showing the invention.
Figure 2:
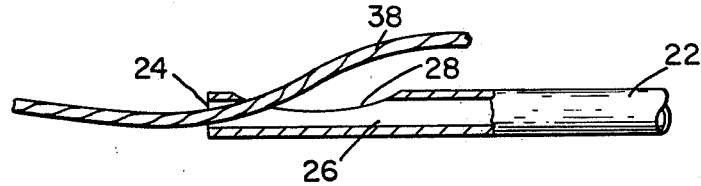
FIG. 2 is a section on an enlarged scale showing the thread guide in a tubular member.

Any means may be provided for holding a spool of thread or silk but it is preferred that the simple means shown by the spring legs 10 and 12 with the pressure members 14 and 16 be used for resiliently holding the spool 18 therebetween. The legs 10 and 12 are enclosed and held in a crimped member 20 which also encloses and holds a tube 22. This tube extends from the crimped member 20 as shown in FIG. 1 terminating in an open end at 24 and having a bore 26 intersected by an opening 28 which may be of any convenient shape but is preferably elongated as shown for the purpose to be described.

Slidably and removably mounted in bore 26 is a smaller tube 30 which has a bore therethrough also, and a hole 32 similar to that at 28, but of course much smaller. This hole intersects the bore in the small tube 30.

The thread is illustrated at 34 and is reeled off the spool, threaded through the hole 32, and extends out the open end 36 of the small tube 30 for the purpose of tying a fly as is well known in the art.

Fly tyers use head silk of a fine diameter but they also of course use heavier materials and even flexible wire and among these materials are floss, chenille, mylar strips, wool, etc. When it is desired to use such material, the spool 18 is removed from its holders 14 and 16 and tube 30 is removed from the tube 22. The larger material floss etc., from a new spool, is then threaded through opening 28 and out the open end 24 of the larger tube 22 for the fly tying purposes of the fly tyer as well known in the art.

I claim:

1. A fly tyer's bobbin comprising a tube, tubular means to telescopically hold the tube, said tubular means being located at one end of the tube, and being of greater diameter to accept the tube, an opening in a side wall of the tube adjacent the other end thereof, said opening communicating with the interior of the tube, said other tube end being open and communicating with the said opening for the passage of fly tyer's material through the opening and out through the open tube end, an opening in the wall of the tubular means, and means to hold a spool of fly tyer's material.

2. The fly tyer's bobbin of claim 1 wherein the opening in the tubular means is larger than the opening in the tube, the latter's open end being smaller than the open end of the tubular means that receives the tube.

3. The fly tyer's bobbin of claim 2 wherein the tube is removable from the tubular means, the latter being usable as a fly tyer's bobbin for thicker fly tyer's material than that accommodated by the opening in the tube.

* * * * *